June 25, 1940.  W. T. GARDNER  2,205,952
DEVICE FOR VIEWING THE INTERIORS OF HEATED ENCLOSURES
Filed June 20, 1939  2 Sheets-Sheet 1

Inventor
William T. Gardner,
by
Smith, Michael & Gardner
Attorneys

June 25, 1940.   W. T. GARDNER   2,205,952
DEVICE FOR VIEWING THE INTERIORS OF HEATED ENCLOSURES
Filed June 20, 1939   2 Sheets-Sheet 2

Inventor
William T. Gardner,
by
Smith, Michael & Gardner,
Attorneys

UNITED STATES PATENT OFFICE 2,205,952

DEVICE FOR VIEWING THE INTERIORS OF HEATED ENCLOSURES

William Temple Gardner, London, England, assignor to Woodall-Duckham (1920) Limited, London, England, a British company Application June 20, 1939, Serial No. 280,207
In Great Britain August 3, 1938

3 Claims. (Cl. 88—74)

The present invention relates to a device for viewing the interior of highly heated enclosures, such as the interior of heated retorts, ovens or chambers, or the heating-flues of such enclosures. The device of the present invention is useful, for example, for examining the state of the walls of heated coke-ovens or coal-carbonising retorts, or the condition of the heating-flues of such structures, while they are at a high temperature.

According to the present invention, I provide a device for viewing the interior of heated enclosures, comprising a metal mirror adapted to be inserted into the enclosure, the reverse surface of the mirror being cooled by circulating a cooling fluid in contact therewith.

Figure 1:
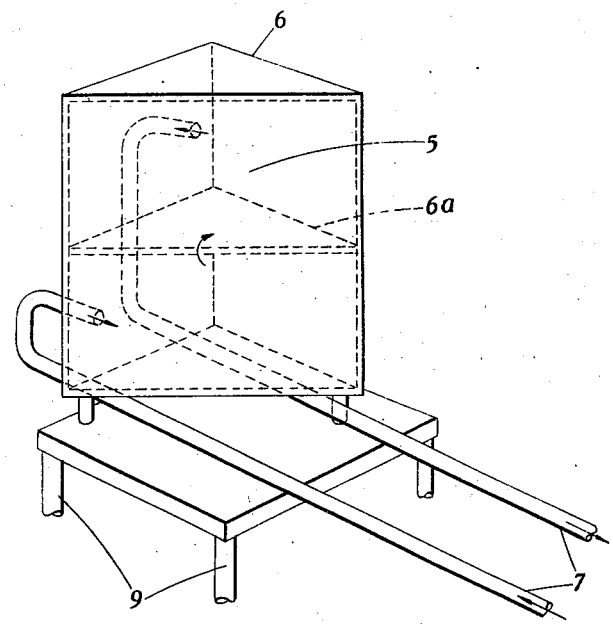
Figure 4:
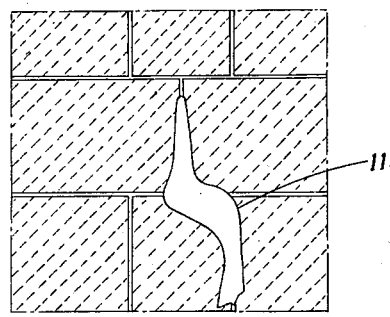
Figure 2:
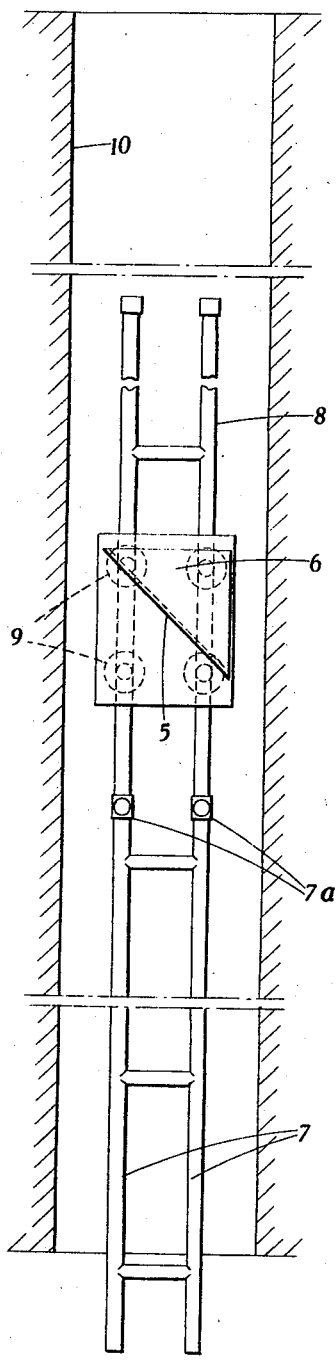
Figure 3:
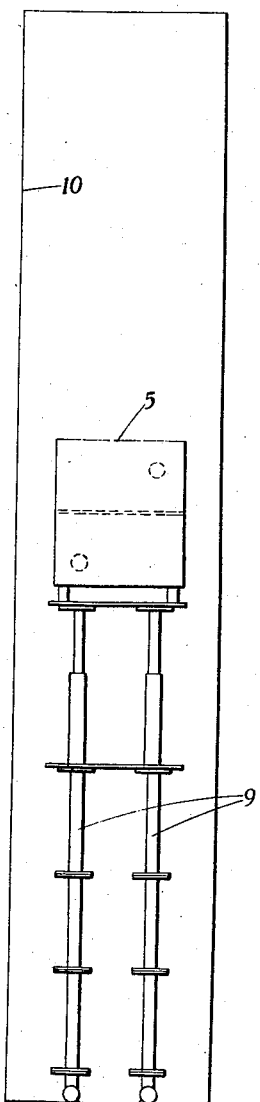

The accompanying drawings illustrate, by way of example, an embodiment of the present invention suitable for examining the walls of heated coke-ovens when the latter are empty. In the drawings, Figure 1 is a perspective view of the mirror, Figure 2 is a plan view, showing the mirror inserted in a coke-oven, Figure 3 is a front elevation of Figure 2, and Figure 4 represents a view seen in the mirror.

The mirror comprises a polished plate 5, for example, of stainless steel or chromium-plated metal, the reverse surface of which is provided with a jacket 6, through which cooling water is continuously circulated through the pipes 7 while the mirror is exposed to heat. The jacket 6 contains a central partition 6a extending nearly to the mirror plate, in order to increase the sweeping action of the cooling water over the rear surface of the mirror.

The mirror is mounted on a sledge 8 which can be pushed along the sole of the empty coke-oven 10, the mirror being carried by vertical pillars 9 which are preferably adjustable in length, so that any level of the oven can be examined. The pipes 7, may, if desired, form the means whereby the sledge with the mirror mounted thereon is pushed into and withdrawn from the oven. In this case the pipes 7 shown in Figure 1 are connected to the pipes 7 in Figure 2 at the points 7a.

It will be observed that the mirror 5 is set at an angle of 45° to the length of the coke-oven 10, so that the condition of the oven walls, as reflected in the mirror, can be observed from outside the oven either directly or through a telescope. The appearance of a crack at a joint of the brickwork as seen in the mirror is shown in Figure 4, the crack appearing as a bright patch 11 against the darker ground of the brickwork.

The present invention also permits the walls of the enclosure to be photographed by means of a camera focussed on the image in the mirror.

If the device of the present invention is employed for examining heating-flues or the like, the shape of the mirror and its support may be suitably adapted thereto. For example, the mirror may be of circular form and of smaller size; it may be mounted directly on the ends of the pipes supplying the cooling water, the pipes forming a long handle by means of which the mirror can be thrust into the flue.

Due to the fact that the reflecting surface of the mirror remains cool despite the highly heated surroundings, its reflecting qualities are not impaired and a clear view is always obtained.

I claim:

1. Device for viewing the interior of a highly heated enclosure, comprising a metal mirror, a sledge-like carriage adapted to slide on the floor of said enclosure, a support adjustable in height for said mirror on the said carriage, said mirror being mounted on the support at an appropriate angle to enable the desired part of the enclosure to be viewed from the exterior, a jacket on the reverse side of said mirror, and pipes to supply and circulate a cooling fluid through said jacket, said pipes connected to the jacket and extending in front of the mirror at an angle of about 45° to it.

2. Device as claimed in claim 1, in which the pipes for the cooling fluid serve as means for moving the sledge-like carriage in the enclosure.

3. Device as claimed in claim 1, in which the mirror comprises a polished plate of stainless steel, with a baffle in the jacket to direct the cooling fluid over the rear surface of the mirror.

WILLIAM TEMPLE GARDNER.